Aug. 26, 1969  R. W. ALLINGTON  3,463,927
APPARATUS FOR MEASURING ABSORBANCE DIFFERENCES
Filed Aug. 2, 1966  2 Sheets-Sheet 1
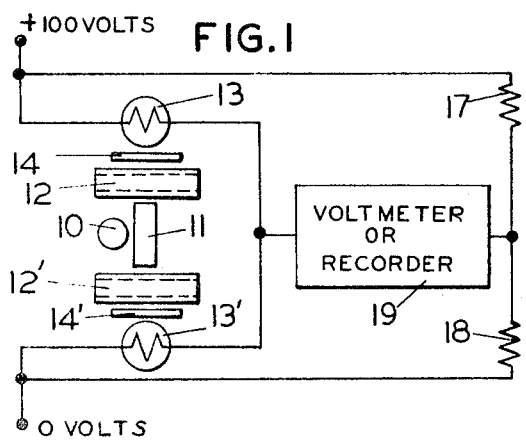
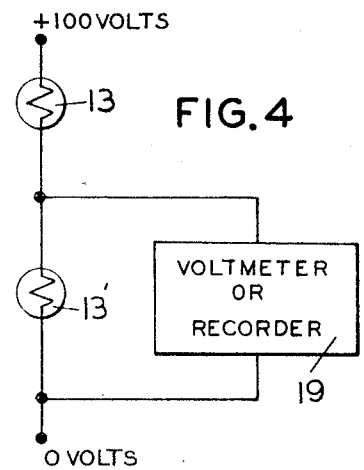
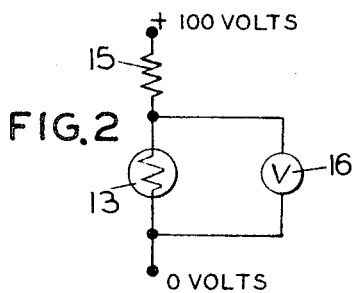
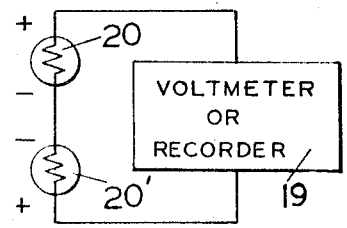
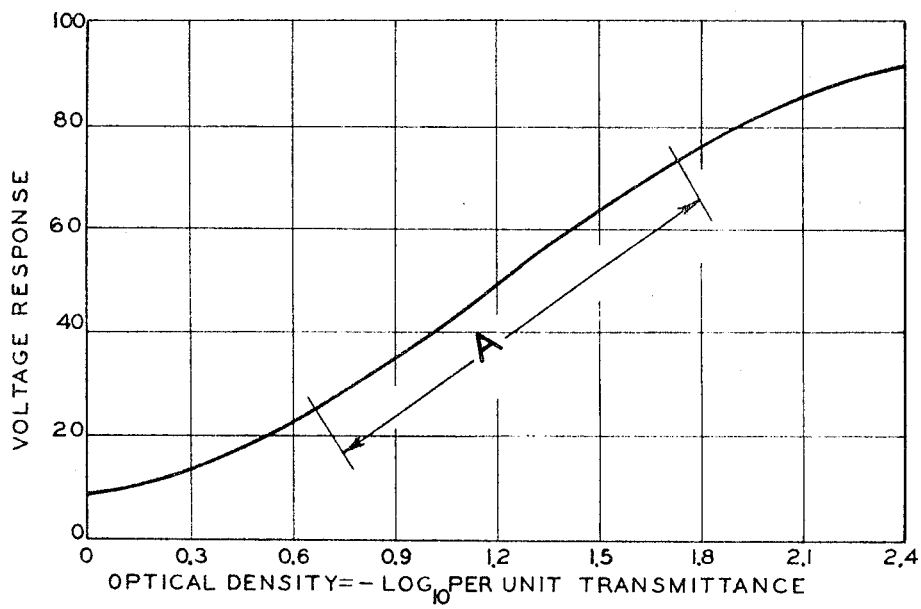
INVENTOR
ROBERT W. ALLINGTON
BY
Richards Lyfelli
ATTORNEY Aug. 26, 1969  R. W. ALLINGTON  3,463,927
APPARATUS FOR MEASURING ABSORBANCE DIFFERENCES
Filed Aug. 2, 1966  2 Sheets-Sheet 2

INVENTOR
ROBERT W. ALLINTON
BY
Richard M Cifelli
ATTORNEY

United States Patent Office 3,463,927
Patented Aug. 26, 1969

3,463,927
APPARATUS FOR MEASURING ABSORBANCE DIFFERENCES
Robert W. Allington, Lincoln, Nebr., assignor to Instrumentation Specialties Company, Lincoln, Nebr., a corporation of Nebraska
Filed Aug. 2, 1966, Ser. No. 569,638
Int. Cl. H01j 39/12
U.S. Cl. 250—211        14 Claims

ABSTRACT OF THE DISCLOSURE

Apparatus for measuring the differences of light absorbance between two light absorbance cells includes a light source transmitting light through each absorbance cell, a pair of photocells individually responsive to light rays emerging from the absorbance cells and means responsive to the output voltages of the photocells; the photocells being connected in series so as to respond substantially logarithmically to the intensity of light impinging on them.

---

This invention relates to apparatus for measuring the light absorbance of substances and more particularly to novel apparatus providing an electrical output which is proportional to light absorbance differences of two fluids.

In certain chemical fractionation procedures, it is desirable to measure the light absorbance differences of two fluids as, for example, the difference in light absorbance, at a given wavelength, of a fluid entering a processing or fractionating unit and the fluid leaving the unit. Also, it often is desirable to measure the differences in light absorbance of a single fluid or material at two different wavelengths. As some materials absorb more light than other materials, at a given wavelength, the absorbance differences and/or the sign of the absorbance difference are useful for purposes of qualitative analysis. It is desirable that either absorbance differences or percent transmission ratios be used, rather than percent transmission differences, since, according to Beer's law, absorbance, the negative logarithm of per unit transmittance, is proportional to the concentration of the light-absorbing material dissolved in a fluid. Absorbance differences will, therefore, be a direct indication of concentration differences. Similarly, because of the logarithmic relationship, transmission ratios can be used as an index of concentration difference. However, transmission ratios are not nearly as convenient to use because of the exponential relationship which exists between transmission readings and concentrations.

It is, therefore, highly desirable to provide apparatus providing an electrical output proportional to a difference of light absorbances. Certain prior apparatus, for accomplishing this purpose, actually operates on the basis of light transmission. An electro-mechanical servo-mechanism is connected in such a way as to divide the output of one linear photocell circuit by the output of a second linear photocell circuit, the photocells being used to monitor light transmission at two points where the measurement is to be made. This arrangement suffers from the difficulty that the indication, being expressed in percent transmittance, is not linearly related to concentration, which is a particular disadvantage when it is desired to integrate areas under peaks of light absorption corresponding to peaks of concentration of a fluid leaving a chemical fractionating system. In contrast, an absorbance recording instrument will produce peak areas each of which are directly proportional to the mass of a concentration peak of light-absorbing solute in the flow stream. Furthermore, the electro-mechanical servo dividing circuit is relatively complex and expensive.

Other prior attempts to produce an absorbance difference measuring system have been to utilize substantially linearly-responsive photocells and then to perform the necessary logarithmic operation, and ratio or subtracting operation, with external electronic and electro-mechanical means.

Apparatus made in accordance with this invention differs from apparatus heretofore available in that the logarithmic operation and subtraction takes place in two photocells and their associated series circuit.

An object of this invention is the provision of a novel photocell circuit for use in apparatus for the direct measurement of light absorbance differences of materials.

An object of this invention is the provision of photoelectric apparatus providing an electrical output which is directly proportional to the difference in the light-absorbing characteristics of substances.

An object of this invention is the provision of apparatus for the measurement of light absorbance differences of two substances, which apparatus comprises two photocells having a substantially logarithmic response to light intensity and connected together, means for directing light of a predetermined wavelength through the substances and onto the photocells, and measurement means responsive to the combined outputs of the photocells.

These and other objects and advantages of the invention will become apparent from the following description when taken with the accompanying drawings. It will be understood, however, that the drawings are for purposes of illustration and are not to be construed as defining the scope or limits of the invention.

In the drawings wherein like reference characters denote like parts in the several views:

FIGURE 1 is a diagrammatic representation of apparatus made in accordance with this invention;

FIGURE 2 is a circuit diagram showing a photo-resistive cell connected in series with a fixed resistor and across a source of voltage;

FIGURE 3 is a curve showing the voltage response of such photocell versus optical density;

FIGURES 4 and 5 are modified diagrams of the photocell and measuring circuit;

Figure 6:
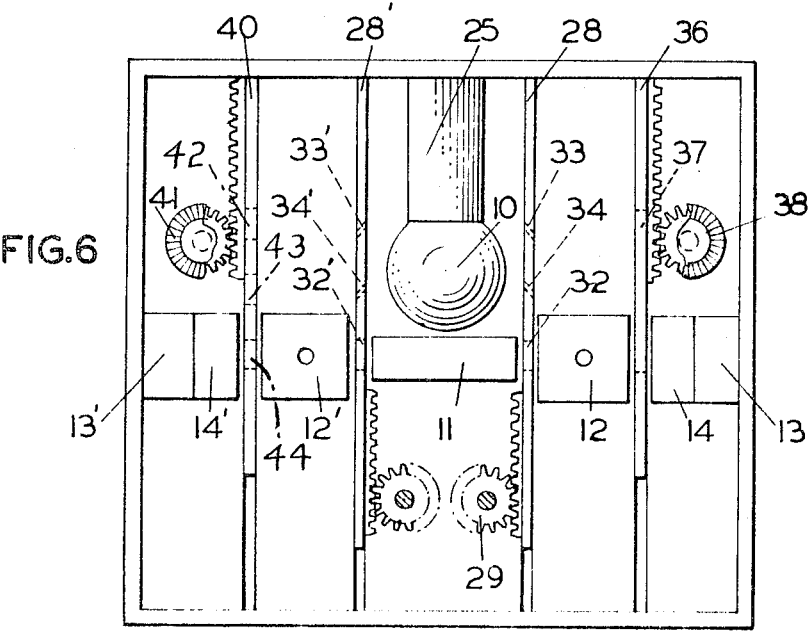
FIGURE 6 is a top plan view, with the top panel removed, showing the assembly of the optical components of the apparatus in a housing.

Referring to FIGURE 1, there is shown a light source 10, comprising a low-pressure mercury vapor exciting lamp, positioned proximate to a transparent tube 11 containing a fluorescent material as, for example, a lanthanum fluoride phosphor with cerium activation as disclosed in Grishoff United States Patent No. 2,450,548. Such material fluoresces at wavelengths of 270 to 333 mu when excited by 254 mu mercury vapor light. A large percentage of the fluorescent light emerges from the ends of the tube 11, which ends are positioned proximate to the optical absorbance cells 12 and 12'. For purposes of reference, the cells 12 and 12' will be referred to as the reference and measurement cells, respectively, and those skilled in this art will understand that solutions to be measured are passed through these cells.

The light rays emerging from the ends of the tube 11 pass through the absorbance cells 12, 12' and impinge upon the photocells 13, 13', which cells are of the photoresistive type. Positioned ahead of the potocells are light filters 14, 14' which filters may be of the type disclosed in my United States Patent No. 3,243,595, dated Mar. 29, 1966. These filters are built in such a way as to have an operating region of 245 to 290 mu. The 290 mu cut off of the filters will result in photometric measurements being made at a center wavelength of, essentially, 280 mu and a bandwidth of 20 mu, extending from 270 to 290 mu.

In FIGURE 2, there is shown one of the photo-resistive cells 13 connected in series with a fixed load resistor 15 across 100 volts D.C., the voltage across the resistor being measured by a voltmeter 16. FIGURE 3 is a curve showing the voltage response of such photocell circuit versus optical density, or absorbance units, which units are proportional to the negative logarithm of light intensity falling upon the cell. It will be noted that the center portion of the curve, specifically, within the region identified by the letter A, is, substantially, a straight line, indicating a linear relationship between voltage output and the negative logarithm of light intensity. The conductivity of a photo-resistive cell varies approximately as the square root of the light intensity striking the cell. However, when such photocell is connected in series with a fixed resistor, and operated at a potential which is an appreciable fraction of the total supply potential, the potential across the photocell has a relationship to light intensity which more nearly relates to the logarithm of light intensity rather than the square root of light intensity. This is because of the fact that as the light intensity decreases, the conductivity of the photocell also decreases as a square root function. This causes the potential across the photocell to rise, but such potential increase is less than that predicted by the square root relationship since the increased potential tends to increase the photocell current, thereby offsetting the decrease in conductivity. Now, if two photo-resistive cells are connected in series, the measured potential will be a very close approximation of the difference in negative logarithm of the light intensities reaching each photocell. Although the photocells respond logarithmically to changes in light intensities, their response is electrically linear.

It may here be pointed out that selecting suitable zero reference levels in the voltmeter or recorder, or by proper choice of the bridge resistors 17 and 18 (FIGURE 1), the measurement can be displaced 0.7 of an optical density unit, thereby making the linear region of the curve (FIGURE 3) extend from 0.0 to 1.0 optical density units. Also, the sensitivity of the measuring instrument can be increased by expanding the scale thereof, so that the measurement is made within a span of less than 1 optical density unit within the substantially linear absorbance region.

Referring back to FIGURE 1, the two photo-resistive cells 13, 13' form two arms of a four-arm bridge energized by 100 volts D.C. The other two arms are formed by the fixed resistors 17 and 18 and the output voltage of the bridge is measured by a device 19 which may be a voltmeter as a recorder. The voltage across each photocell varies logarithmically with the intensity of the light impinging thereon, and these voltages are combined (subtracted) in the network. When the light reaching one photocell becomes greater, the combined output voltage will increase and when the light reaching the other photocell becomes greater, the combined output voltage will decrease. Thus, the record made by the recorder will correspond to absorbance differences relating to the optical absorbance cells associated with the two photocells. The series combination of photo-resistive cells does not usually require temperature compensation since temperature changes effect the resistance of both cells simultaneously. Under conditions of equal light reaching both photocells, the two resistances will change equally with temperature and the output voltage will remain constant. The change in sensitivity to absorbance differences is not greatly affected by temperature because an increase of photocell resistance, which would tend to decrease the sensitivity, will be compensated for by the photocell having correspondingly increased load resistance of the opposing photocell.

FIGURE 4 shows a modified circuit wherein the voltage appearing across one of the photo-resistive cells 13 and 13' is measured by the voltage-responsive device 19.

A semiconductor, p-n junction photocell provides a substantially logarithmic response to light intensity, when its voltage is measured under substantially open circuit conditions, and such voltage is related to the intensity of the light reaching the photocell. Two semiconductor cells 20 and 20' may be utilized in the practice of this invention when connected in a series-opposing circuit, as shown in FIGURE 5. This arrangement, however, requires the use of a stable amplifier for driving the read-out device 19 as the output voltage from the photocells is relatively small. Also, these photocells have an appreciable temperature coefficient which effects the output voltage. Since the photocells are series connected, an equal temperature change on each photocell will not effect the output of the combination when equal light is falling on each photocell and each photocell is producing an equal potential. However, temperature fluctuations will affect the sensitivity of the photocell combination to absorbance differences. Further, the spectral response of this type of photocell is limited to the visible and near infra red portions of the spectrum. The ultraviolet position of the spectrum is very important in chemical analysis. Although sensitive, stable, D.C. amplifiers are available and the temperature problem can be overcome by using a suitable temperature compensation network, this arrangement, by itself, is not useful for operation in the ultraviolet range. In contrast, the arrangement shown in FIGURE 1, utilizing two series-connected photo-resistive cells, eliminates the troubles associated with the low output potentials of photo-voltaic cells as the voltage impressed across the series combination of the two photo-resistive cells can be made quite high. Furthermore, the FIGURE 1 arrangement does not require temperature-compensating.

Neither photo-resistive nor p-n junction semiconductor cells of commonly available types operate in the ultraviolet region of the spectrum. The fluorescent filter disclosed in my above-referenced Patent No. 3,243,595 converts the ultraviolet light to visible light which excites the photocells. The photo-resistive cell has an advantage over the photo-voltaic p-n junction cell because of the difficulty of matching the fluorescent emission wavelength peak of the filter to the wavelength of maximum sensitivity of a photo-voltaic cell. Photo-resistive cells are readily available with wavelengths of maximum sensitivity which correspond to wavelengths of maximum light output of phosphors which could be used in the filter of the above patent.

Figure 7:
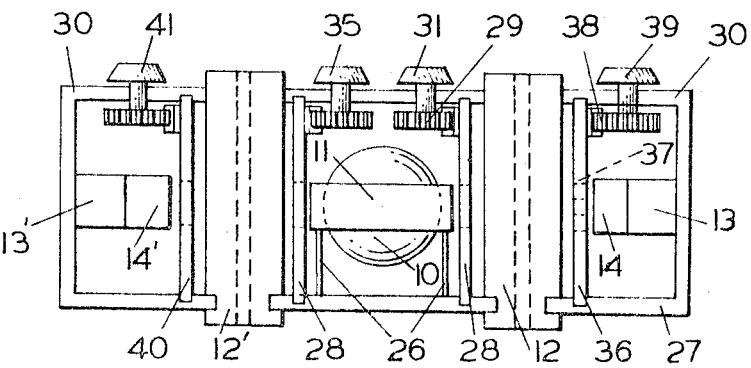
FIGURE 7 is a side elevational view thereof, with the housing side panel removed.

The arrangement and assembly of the optical components of the apparatus is shown in FIGURES 6 and 7, to which reference now is made. FIGURE 6 is a top plan view with the top panel of the housing removed and FIGURE 7 is a side elevational view with the side panel removed. The ultraviolet exciting lamp 10 is carried by a suitable support 25 secured to a side wall of the housing, said lamp being centrally disposed with respect to the tube 11, which tube contains the fluorescent material and is secured in position by two brackets 26 extending from the rear panel 27 of the housing. The two optical absorbance cells 12 and 12' extend through the top and bottom panels of the housing and are secured in fixed position by any suitable means. The reference photocell 13 and the measuring photocell 13', and their associated light filters 14 and 14', are secured in fixed positions and in axial alignment with the tube 11. Slidably positioned between the rear end of the tube 11 and the reference absorbance cell 12 is a slide member 28 having secured thereto a gear rack which is in mesh with a pinion gear 29 carried by a shaft which extends through a hole formed in the front panel 30. It will be apparent that upon clockwise rotation of the knob 31, the slide member will be displaced toward the side wall of the housing. The slide member is provided with a hole 32, which, in the illustrated position of the slide member, permits light to pass from the rear end of the tube 11 through the reference absorbance cell 12. As described hereinabove, this light has a wavelength of 280 mu. A pair of spaced, diagonal mirrors 33 and 34 are built in the slide member in such manner that when the slide member is in the illustrated position direct light from the lamp 10 cannot strike the absorbance cell. However, upon displacement of the slide member, the mirror 33 can be positioned directly behind the lamp and, simultaneously, the mirror 34 will occupy a position along the axis of the tube 11. Now, horizontal light rays from the lamp strike the mirror 33, are reflected to the mirror 34 and then rearwardly through the absorbance cell. Thus, by this means, the light wavelength going through the absorbance cell can be selected to be either 254 or 280 mu.

A similar slide member 28' is arranged for sliding movement between the front end of the tube 11 and the measuring absorbance cell 12', said slide member having a hole 32' formed therein and carrying the diagonal mirrors 33' and 34', whereby light having a selected wavelength of 254 or 280 mu can be directed to the measuring absorbance cell 12' upon rotation of the knob 35.

The apparatus is provided with additional slide members for zero adjusting (base line adjusting) and for calibration purposes. The zero adjusting slide member 36 is positioned between the reference absorbance cell 12 and the filter 14 associated with the reference photocell 13, which is the photocell whose output has a negative effect on the measured voltage. This slide member has formed therethrough a wedge-shaped aperture 37. By means of the gear rack (secured to the slide member) and the cooperating pinion gear 38, the slide member is displaceable in one or the other direction by rotation of the knob 39. In the illustrated position, the effective aperture opening, permitting the passage of light from the absorbance cell to the photocell, is a minimum. Movement of the slide member toward the side panel of the housing results in an increase in the effective aperture opening, thereby permitting an increased amount of the light to strike the photocell. Thus, it will be apparent that the base line of the voltage curve drawn by the recorder (see also FIGURE 1) is adjustable by rotation of the knob 39.

A fourth slide member 40 is arranged for sliding movement between the measuring absorbance cell 12' and the measuring photocell 13', upon rotation of the knob 41, said photocell being the one whose response tends to make the recorder read in a positive direction. This slide member carries several light absorbance standards 42, 43 and 44 for calibrating the recorder. Suitable absorbance standards may take the form of metal screens or semi-transparent glasses which transmit a known percentage of the light incident upon them.

Figure 8:
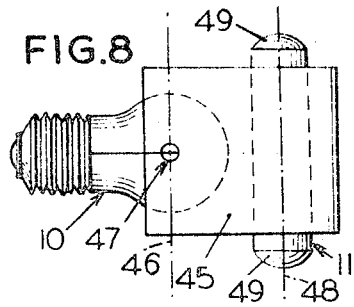
FIGURES 8 and 9 are, respectively, top plan and end elevational views showing a modification of the lamp and fluorescent tube arangement.
Figure 9:
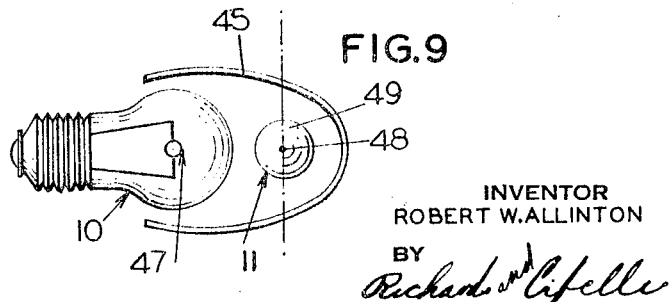

A modification of the lamp and fluorescent tube assembly is shown in FIGURES 8 and 9, FIGURE 8 being a top plan view and FIGURE 9 being an end elevational view. A reflector 45, comprising a section of an elliptical cylinder, is disposed over the lamp 10 and the tube 11. The reflector is so arranged that one axis of focus 46 passes through the bright spot 47 of the lamp, while the other axis of focus 48 coincides with the axis of the tube. Thus, the reflector serves to concentrate the exciting light upon the tube, thereby increasing the fluorescent output thereof. Also, it is desirable to collimate the light emerging from the tube ends so that less illumination is wasted as it passes through the optical flow cells to the photocells. This can be done by rounding the ends of the tube to the shape of convex lenses. Alternatively, convex lens elements 49 may be cemented, clamped, or otherwise secured to the flat tube ends. By using the elliptical reflector and the light collimating means at each end of the tube, a smaller and less expensive exciting lamp may be used while still providing sufficient illumination on the photocells to provide good stability.

While the construction and operation of the apparatus has been described with reference to an ultra violet exciting lamp, it will be apparent that other types of light sources can be used. A tungsten or hydrogen discharge lamp could be used with a prism or grating monochromator, with interference or absorption filters or with a wedge interference filter. Those skilled in this art will be able to make other changes and variations without thereby departing from the spirit and scope of the invention.

I claim:

1. Apparatus for the measurment of differences of light absorbance between two light absorbance cells of the class comprising a light source transmitting light rays through each absorbance cell, a pair of photo-resistive photocells individually responsive to light rays emerging from the absorbance cells and means responsive to the output voltages of the photocells, which apparatus is characterized in that the photocells are connected in series and respond substantially logarithmically to the intensity of light impinging upon them.

2. Apparatus for direct measurement of the difference of light absorbance between two light absorbance cells comprising,
   (a) a light source,
   (b) means directing light rays from said source through each of the absorbance cells,
   (c) a pair of photo-resistive photocells, each photocell receiving light rays emerging from an absorbance cell,
   (d) circuit elements connecting the said photocells in series so that said cells respond substantially logarithmically to the intensity of light falling thereon, and
   (e) read-out means responsive to the combined voltage output of the photocells.

3. The invention as recited in claim 2, including a source of D.C. voltage connected across the two photocells.

4. The invention as recited in claim 3, wherein the said photocells form two arms of a bridge having two fixed resistors forming the other two arms thereof, wherein the said source of voltage is connected to the bridge input junctions, and wherein the said read-out means is connected to the bridge output junctions.

5. The invention as recited in claim 2, wherein the said light source is a low pressure mercury vapor lamp.

6. The invention as recited in claim 5, including light filters individually positioned between an absorbance cell and the assocated photocell, said light filters passing only light rays of a predetermined wavelength.

7. The invention as recited in claim 2, wherein the light source comprises material which fluoresces when excited by ultraviolet light, said material being contained within a tubular member having ends proximate to the said absorbance cells; and a low pressure mercury vapor lamp positioned proximate to the said tubular member.

8. The invention as recited in claim 7, including an elliptical reflector positioned over the said lamp and tubular member, one axis of focus of the reflector passing substantially through the bright spot of the lamp and the other axis of focus of the reflector coinciding with the axis of the tubular member.

9. The invention as recited in claim 7, including light collimating elements disposed between the ends of said tubular member and the absorbance cells.

10. Apparatus comprising:
   (a) a low pressure mercury vapor lamp,
   (b) a tubular member positioned proximate to said lamp and containing a fluorescent material which emits light at a continuum of longer wavelengths,
   (c) a pair of optical cells, each cell being positioned to receive fluorescent light emerging from one end of the tubular member, (d) a pair of light filters, each filter positioned to receive light passing through one of the optical cells and each filter having a long wavelength cut off which is shorter than the longest wavelength emitted from the fluorescent material, (e) a pair of photo-resistive photocells connected in series, each photocell positioned to receive light transmitted through one of said filters, said photocells being of the type having a logarithmic response to the intensity of light impinging upon them when so connected, and (f) read-out means responsive to the output voltages of the photocells.

11. The invention as recited in claim 10, including a first slide member having a variable area aperture; means mounting the first slide member for movement between one optical cell and its associated photocell; a second slide member carrying a plurality of light absorbance standards; and means mounting the second slide member for movement between the other optical cell and the associated photocell.

12. The invention as recited in claim 11, wherein the photocells are connected to form two arms of a bridge energized by a D.C. voltage, the other arms of the bridge being fixed resistors, and wherein the said read-out means is a recorder connected to the output junctions of the bridge.

13. The invention as recited in claim 10, including a third slide member mounted for sliding movement between one end of the tubular member and the said one optical cell; means forming an opening in said third slide member which opening is axially alignable with said tubular member upon movement of the slide member in one direction; a pair of diagonal mirrors carried by the third slide member and spaced from said opening, said mirrors being arranged to reflect light from said lamp to said one optical cell upon movement of the slide member in the other direction; a fourth slide member mounted for sliding movement between the other end of the tubular member and the said other optical cell; means forming an opening in the fourth slide member which opening is axially alignable with said tubular member upon movement of the slide member in one direction; and a pair of diagonal mirrors carried by the fourth slide member and spaced from the opening thereof, said mirrors being arranged to reflect light from said lamp to the said other optical cell upon movement of the slide member in the other direction.

14. The invention as recited in claim 13; wherein the photocells are connected to form two arms of a bridge energized by a D.C. voltage, the other arms of the bridge being fixed resistors, and wherein the said read-out means is a recorder connected across the output junctions of the bridge.

References Cited

UNITED STATES PATENTS

| | | | |
|---|---|---|---|
| 2,450,548 | 10/1948 | Gisolf et al. | 250—84 |
| 2,510,347 | 6/1950 | Perkins. | |
| 2,547,212 | 4/1951 | Jamison et al. | 250—204 X |
| 2,964,993 | 12/1960 | Witt | 250—227 X |
| 3,028,499 | 4/1962 | Farrall | 250—212 X |
| 3,076,375 | 2/1963 | Donnell | 250—210 X |
| 3,093,785 | 6/1963 | Edgerton | 250—210 X |
| 3,103,546 | 9/1963 | Kapany | 250—227 X |
| 3,243,595 | 3/1966 | Allington | 250—226 |
| 3,377,484 | 3/1968 | Hilferink | 260—210 X |

OTHER REFERENCES

Nash and Luft, Improved Silicon Photovoltaic Cells, Electronic Industries, vol. 18, No. 8, August 1959.

RALPH G. NILSON, Primary Examiner

C. M. LEEDOM, Assistant Examiner

U.S. Cl. X.R.

250—212, 218, 226, 227, 228; 356—206